United States Patent
Velusamy et al.

(10) Patent No.: US 10,090,908 B1
(45) Date of Patent: Oct. 2, 2018

(54) DATA SERVICES FOR WIRELESS COMMUNICATION DEVICES THAT ARE ATTACHED TO WIRELESS REPEATER CHAINS

(71) Applicant: Sprint Communications Company L.P., Overland Park, KS (US)

(72) Inventors: Saravana Velusamy, Olathe, KS (US); Sreekar Marupaduga, Overland Park, KS (US); Maneesh Gauba, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 87 days.

(21) Appl. No.: 15/227,166

(22) Filed: Aug. 3, 2016

(51) Int. Cl.
- *H04B 7/14* (2006.01)
- *H04W 8/04* (2009.01)
- *H04W 76/04* (2009.01)
- *H04W 76/27* (2018.01)

(52) U.S. Cl.
CPC .............. *H04B 7/14* (2013.01); *H04W 8/04* (2013.01); *H04W 76/046* (2013.01); *H04W 76/27* (2018.02)

(58) Field of Classification Search
CPC ..... H04W 84/047; H04W 40/22; H04W 8/04; H04W 76/046; H04W 76/27; H04L 45/02; H04L 45/122; H04B 7/15507; H04B 7/15542; H04B 7/14
See application file for complete search history.

(56) References Cited

U.S. PATENT DOCUMENTS

| | | | |
|---|---|---|---|
| 8,472,868 B2 | 6/2013 | Mu et al. | |
| 8,797,940 B2 | 8/2014 | Racz et al. | |
| 8,839,373 B2 | 9/2014 | Palanigounder et al. | |
| 8,867,432 B2 | 10/2014 | Lee et al. | |
| 8,948,078 B2 | 2/2015 | Speight et al. | |
| 2009/0122744 A1 | 5/2009 | Maltsev et al. | |
| 2011/0208842 A1* | 8/2011 | Mildh | H04B 7/155 709/220 |
| 2013/0023204 A1* | 1/2013 | Ode | H04B 7/15507 455/11.1 |
| 2013/0107768 A1* | 5/2013 | Murakami | H04W 40/10 370/310 |
| 2015/0140945 A1 | 5/2015 | Godin et al. | |
| 2017/0041752 A1* | 2/2017 | Baek | H04W 4/023 |

* cited by examiner

*Primary Examiner* — Phong La (57) ABSTRACT

A wireless base station receives attachment signaling for User Equipment (UE) from a wireless repeater chain and identifies a number of repeater hops for the UE between the base station and a serving wireless repeater. The base station transfers signaling indicating the UE ID and the number of wireless repeater hops. A network controller receives the signaling and selects data services for the UE based on the UE ID and the number of wireless repeater hops. The network controller exchanges signaling indicating the selected data services for the UE with a network element to deliver the data services to the UE. The network controller transfers signaling indicating the UE ID and the selected data services to the wireless base station. In some examples, the data services comprise Access Point Names (APNs), and the network controller comprises a Mobility Management Entity (MME).

16 Claims, 8 Drawing Sheets

DATA SERVICES FOR WIRELESS COMMUNICATION DEVICES THAT ARE ATTACHED TO WIRELESS REPEATER CHAINS

TECHNICAL BACKGROUND

Data communication systems exchange user data with User Equipment (UE) to provide various data communication services. The UE may be a phone, computer, media player, and the like. The data communication services may be Internet access, voice/video calling, messaging applications, evolved Multimedia Broadcast Multicast Service (eMBMS), or some other computerized information service.

A popular wireless communication technology is Long Term Evolution (LTE). LTE networks use wireless base stations called evolved Node Bs (eNodeBs) to wirelessly connect UEs to LTE networks. The LTE networks comprise network elements like Mobility Management Entities (MMEs), gateways, routers, and servers. The MME orchestrates session control over the LTE network to deliver multiple data services to the UE. The UE then exchanges user data with the gateways systems over the eNodeB to deliver the data services.

Wireless repeaters extend the range of the eNodeBs in LTE networks. A wireless repeater receives a wireless signal from the eNodeB, amplifies the received signal, and then transmits the amplified version of the received signal to the UE. Likewise, the wireless repeater receives a wireless signal from the UE, amplifies the received signal, and then transmits the amplified version of the signal to the eNodeB. The wireless repeaters are often linked together to form a repeater chain that extends from the LTE eNodeB.

In cost-effective implementations, the wireless repeaters do not perform advanced data service control at the LTE layer. However, these cost-effective repeaters enable very long and efficient repeater chains to extend from the eNodeB. Long repeater chains are actually better suited for some environments and data services than the more complex and expensive eNodeBs.

Unfortunately, the long and cost-effective repeater chains also experience increased latency—largely due to processing delay in the repeaters themselves. Thus, long and cost-effective repeater chains may be ideal for basic services like messaging and internet access, but the latency toward the end of the repeater chains may unduly debilitate some data services. For example, an interactive holographic gaming service may not be adequately deliverable after several wireless repeater hops.

TECHNICAL OVERVIEW

A wireless base station receives attachment signaling for User Equipment (UE) from a wireless repeater chain and identifies a number of repeater hops for the UE between the base station and a serving wireless repeater. The base station transfers signaling indicating the UE ID and the number of wireless repeater hops. A network controller receives the signaling and selects data services for the UE based on the UE ID and the number of wireless repeater hops. The network controller exchanges signaling indicating the selected data services for the UE with a network element to deliver the data services to the UE. The network controller transfers signaling indicating the UE ID and the selected data services to the wireless base station. In some examples, the data services comprise Access Point Names (APNs), and the network controller comprises a Mobility Management Entity (MME).

DETAILED DESCRIPTION

Figure 1:
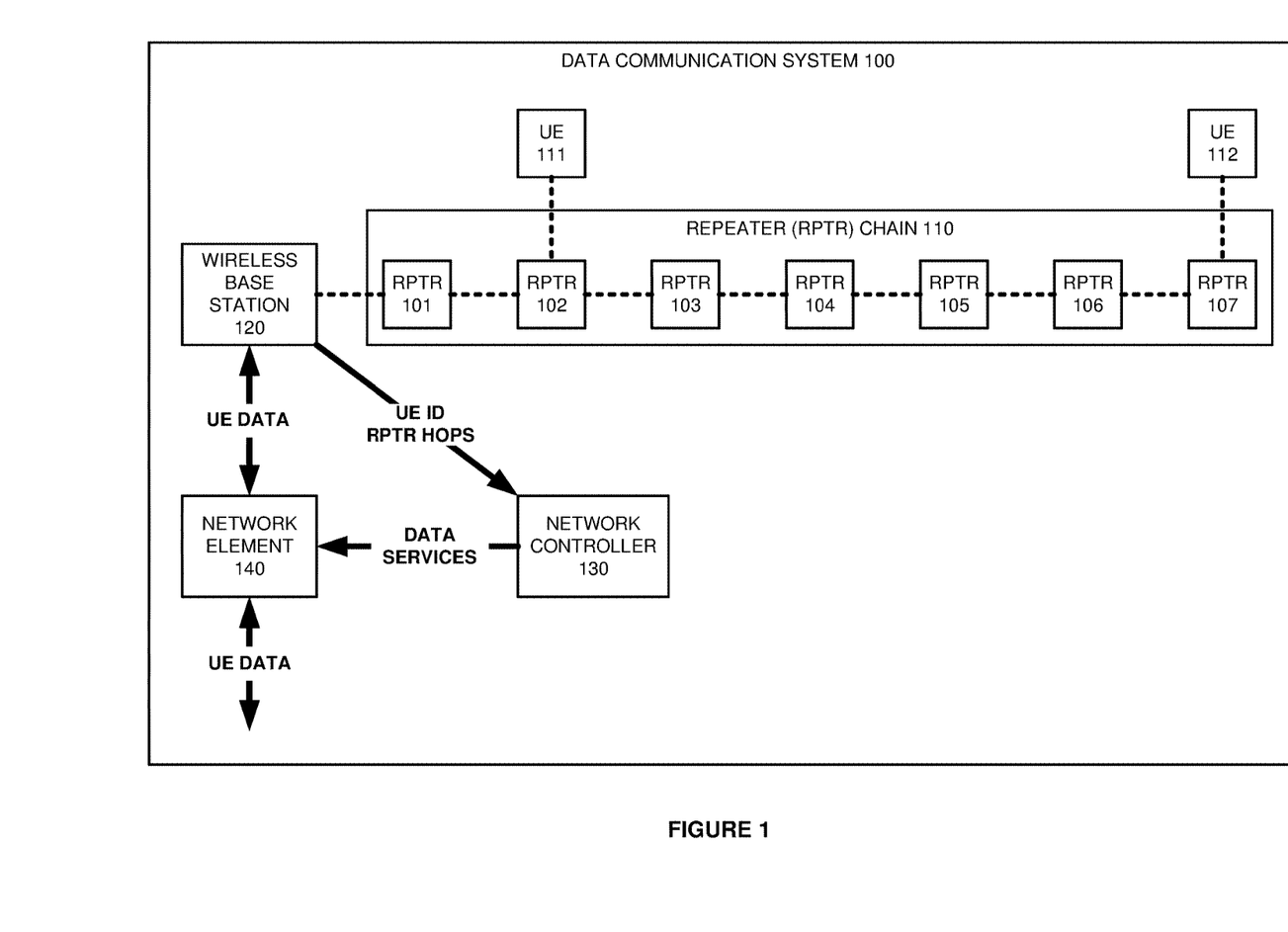
FIGS. 1-3 illustrates a data communication system to deliver data services to wireless communication devices that attach to a wireless repeater chain.
Figure 2:
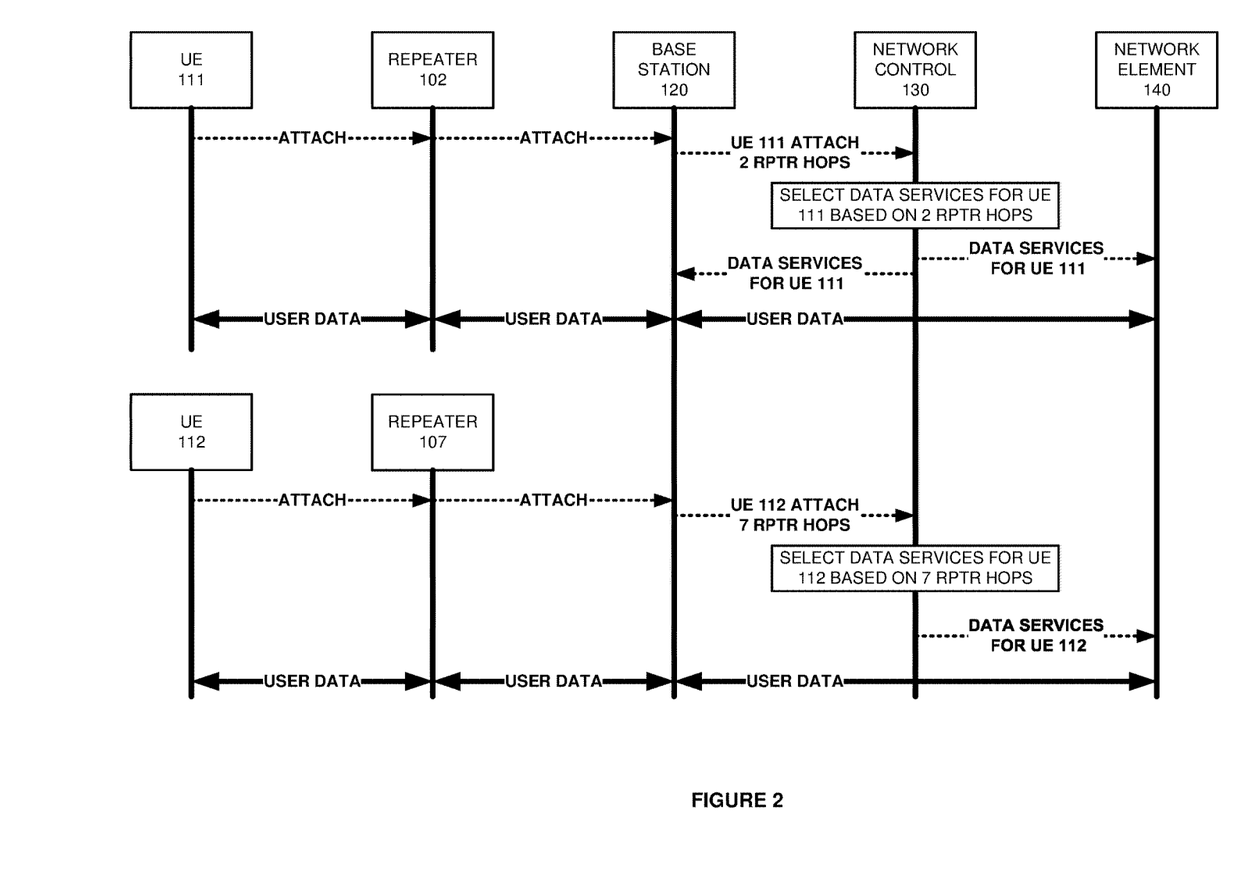
Figure 3:
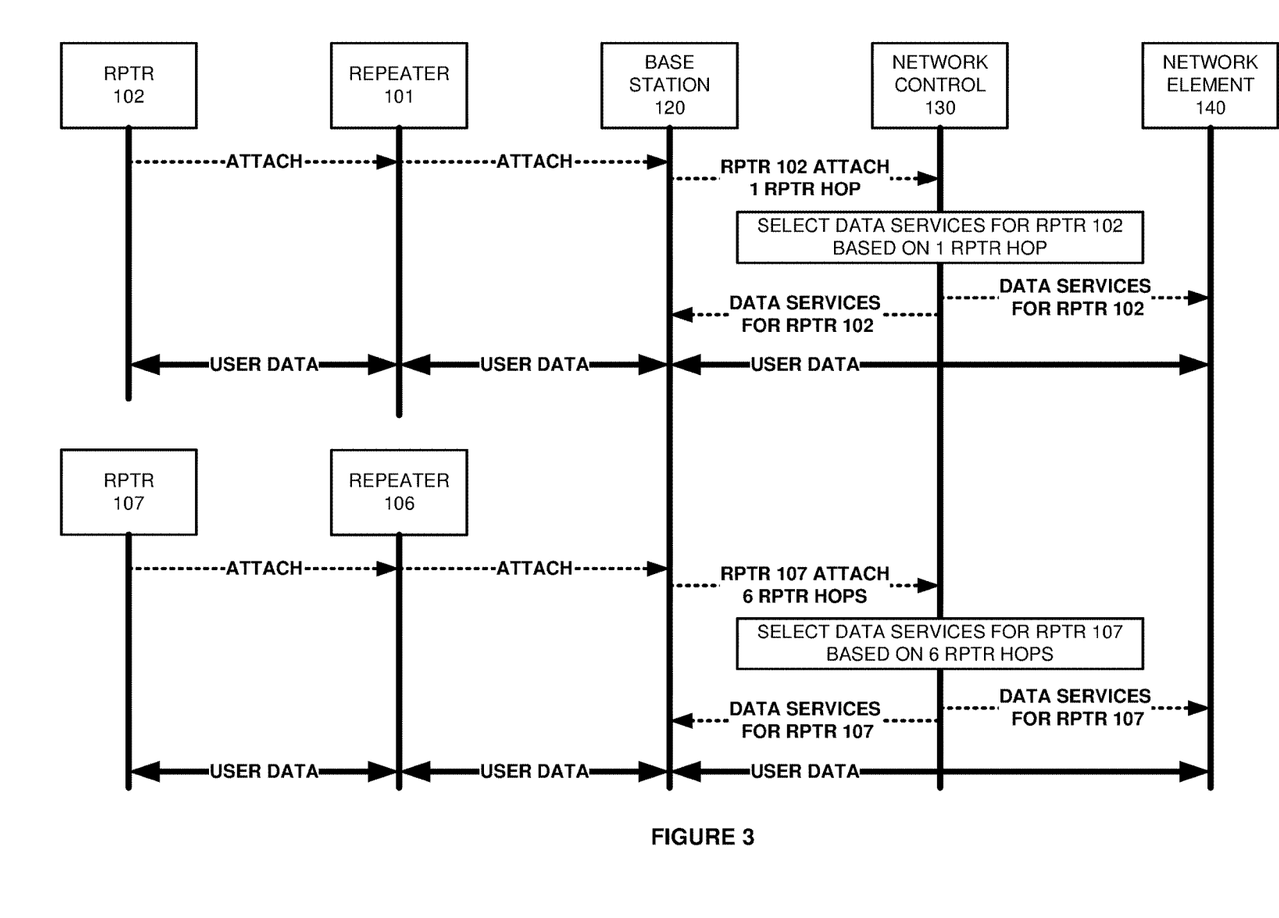

FIGS. 1-3 illustrates data communication system 100 to deliver data services to wireless communication devices that attach to wireless repeater chain 110. Data communication system 100 comprises repeater (RPTR) chain 110, User Equipment (UEs) 111-112, wireless base station 120, network controller 130, and network element 140. Repeater chain 110 comprises wireless repeaters 101-107. User Equipment (UEs) 111-112 comprise a computer, phone, media player, or some other intelligent machine with a wireless communication transceiver. Wireless repeaters 101-107 comprise antennas, amplifiers and transceivers to receive, amplify, and transmit wireless signals.

Wireless base station 120 comprises a Long Term Evolution (LTE) evolved Node B (eNodeB), LTE relay, 5G base station, Wireless Fidelity (WIFI) hotspot, LTE/WIFI Aggregation (LWA) node, or some other wireless access point. Network controller 130 comprises data processing circuitry, data memory, data communication transceivers, and operating software. Network controller 130 directs network element 140 to deliver connectivity for the data services. Network controller 130 may comprise a Mobility Management Entity (MME), Home Subscriber System (HSS), and/or some other control database. Network controller 130 may comprise Software Defined Network (SDN) applications and/or Network Function Virtualization (NFV) Virtual Network Functions (VNFs). Network element 140 comprises a computerized gateway, server, router, or some other communication equipment.

In operation, UE 111 attaches to serving wireless repeater 102 in wireless repeater chain 110. Wireless base station 120 receives the attachment signaling for UE 110 from wireless repeater chain 110. In response, wireless base station 120 identifies the number of wireless repeater hops (2) for UE 111 between wireless base station 120 and serving wireless repeater 102. Also in response to the attachment signaling, wireless base station 120 transfers initial UE signaling indicating the UE identity and the number of wireless repeater hops (2) to network controller 140. The initial UE signaling may comprise S1AP Initial UE signaling that indicates the number of wireless repeater hops.

Network controller 130 receives the initial UE signaling and responsively selects a set of the data services for UE 111 based on the UE identity and the number of wireless repeater hops (2). As the number of wireless repeater hops increase, the number of available data services decreases. Network controller 130 exchanges session creation signaling with network element 140 indicating the selected set of the data services for UE 110. Network controller 140 also transfers session context signaling indicating UE 110 and the selected set of the data services for delivery to wireless base station 120. The data services may comprise Access Point Names (APNs), Uniform Resource Indicators (URIs), or some other service ID.

In some examples, wireless base station 120 also identifies a distance between wireless base station 120 and serving wireless repeater 102. Wireless base station 120 indicates the distance in the initial UE signaling to network controller 130. In these examples, Network controller 140 selects the set of the data services for UE 110 based on the UE identity, the number of wireless repeater hops, and the distance.

In some examples, network controller 130 indicates a non-selected set of the data services for UE 111 in the session context signaling to wireless base station 120. Wireless base station 120 transfers additional attachment signaling to wireless repeater chain 110 for delivery to UE 111 indicating both the selected set of data services and the non-selected set of data services. The session context signaling may be S1AP Initial Context Setup Request signaling. The UE signaling may comprise RRC signaling to wireless repeater chain 110 for delivery to UE 111 indicating the selected set of the data services and indicating the non-selected set of the data services.

Referring to FIG. 2, UE 111 attaches to serving wireless repeater 102 in wireless repeater chain 110. Wireless base station 120 receives the attachment signaling for UE 110 from the wireless repeater chain. In response, wireless base station 120 identifies the number of wireless repeater hops (2) for UE 111 between wireless base station 120 and serving wireless repeater 102. Also in response to the attachment signaling, wireless base station 120 transfers initial UE signaling indicating the UE identity and the number of wireless repeater hops (2) to network controller 140. The initial UE signaling may comprise S1AP Initial UE signaling that indicates the number of wireless repeater hops.

Network controller 130 receives the initial UE signaling and responsively selects a set of data services for UE 111 based on the UE identity and the number of wireless repeater hops (2). In many cases, all data services will be available at 2 hops. As the number of wireless repeater hops increases, the number of available data services decreases. Network controller 130 transfers session creation signaling to network element 140 indicating the selected set of data services for UE 110. Network controller 140 also transfers session context signaling indicating UE 110 and the selected set of data services to wireless base station 120.

UE 112 attaches to serving wireless repeater 107 in wireless repeater chain 110. Wireless base station 120 receives the attachment signaling for UE 112 from wireless repeater chain 110. In response, wireless base station 120 identifies the number of wireless repeater hops (7) for UE 112 between wireless base station 120 and serving wireless repeater 107. Also in response to the attachment signaling, wireless base station 120 transfers initial UE signaling indicating the UE identity and the number of wireless repeater hops (7) to network controller 130. Network controller 130 receives the initial UE signaling and responsively selects a set of the data services for UE 112 based on the UE identity and the number of wireless repeater hops (7). In many cases, some data services will no longer be available at 7 hops. For example, a high-resolution gaming service may not be available at 7 repeater hops. Network controller 130 transfers session creation signaling to network element 140 indicating the selected set of data services for UE 112. Network controller 140 also transfers session context signaling indicating UE 112 and the selected set of data services to wireless base station 120.

Referring to FIG. 3, the control of data services for repeaters 101-107 is described. The repeater data services may include repeater internet data backhaul, repeater voice backhaul, and repeater signaling backhaul. Repeater (RPTR) 102 attaches to serving wireless repeater 101 in wireless repeater chain 110. Wireless base station 120 receives the attachment signaling for RPTR 102 from wireless repeater chain 110. In response, wireless base station 120 identifies the number of wireless repeater hops (1) for RPTR 102 between wireless base station 120 and serving wireless repeater 101. Also in response to the attachment signaling, wireless base station 120 transfers initial RPTR-UE signaling indicating the RPTR-UE identity and the number of wireless repeater hops (1) to network controller 140. The initial RPTR-UE signaling may comprise S1AP Initial UE signaling that indicates the number of wireless repeater hops.

Network controller 130 receives the initial RPTR-UE signaling and responsively selects a set of repeater data services for RPTR 102 based on the RPTR identity and the number of wireless repeater hops (1). In many cases, all repeater data services will be available after 1 hop. As the number of wireless repeater hops increases, the number of available repeater data services decreases. For example, a RPTR does not need a repeater voice backhaul data service if attached UEs cannot receive voice service from the RPTR based on the above operations for FIG. 2. Network controller 130 transfers session creation signaling to network element 140 indicating the selected set of the repeater data services for RPTR 102. Network controller 140 also transfers session context signaling indicating RPTR 102 and the selected set of the repeater data services to wireless base station 120.

RPTR 107 attaches to serving wireless repeater 106 in wireless repeater chain 110. Wireless base station 120 receives the attachment signaling for RPTR 107 from the wireless repeater chain. In response, wireless base station 120 identifies the number of wireless repeater hops (6) for RPTR 107 between wireless base station 120 and serving wireless repeater 106. Also in response to the attachment signaling, wireless base station 120 transfers initial RPTR-UE signaling indicating the UE identity and the number of wireless repeater hops (6) to network controller 140. The initial RPTR-UE signaling may comprise S1AP Initial UE signaling that indicates the number of wireless repeater hops.

Network controller 130 receives the initial RPTR-UE signaling and responsively selects a set of repeater data services for RPTR 107 based on the RPTR ID and the number of wireless repeater hops (6). In many cases, some data services will no longer be available at 6 hops, such as repeater voice backhaul. Network controller 130 transfers session creation signaling to network element 140 indicating the selected set of the repeater data services for RPTR 107. Network controller 130 also transfers session context signaling indicating RPTR 107 and the selected set of repeater data services to wireless base station 120.

Figure 4:
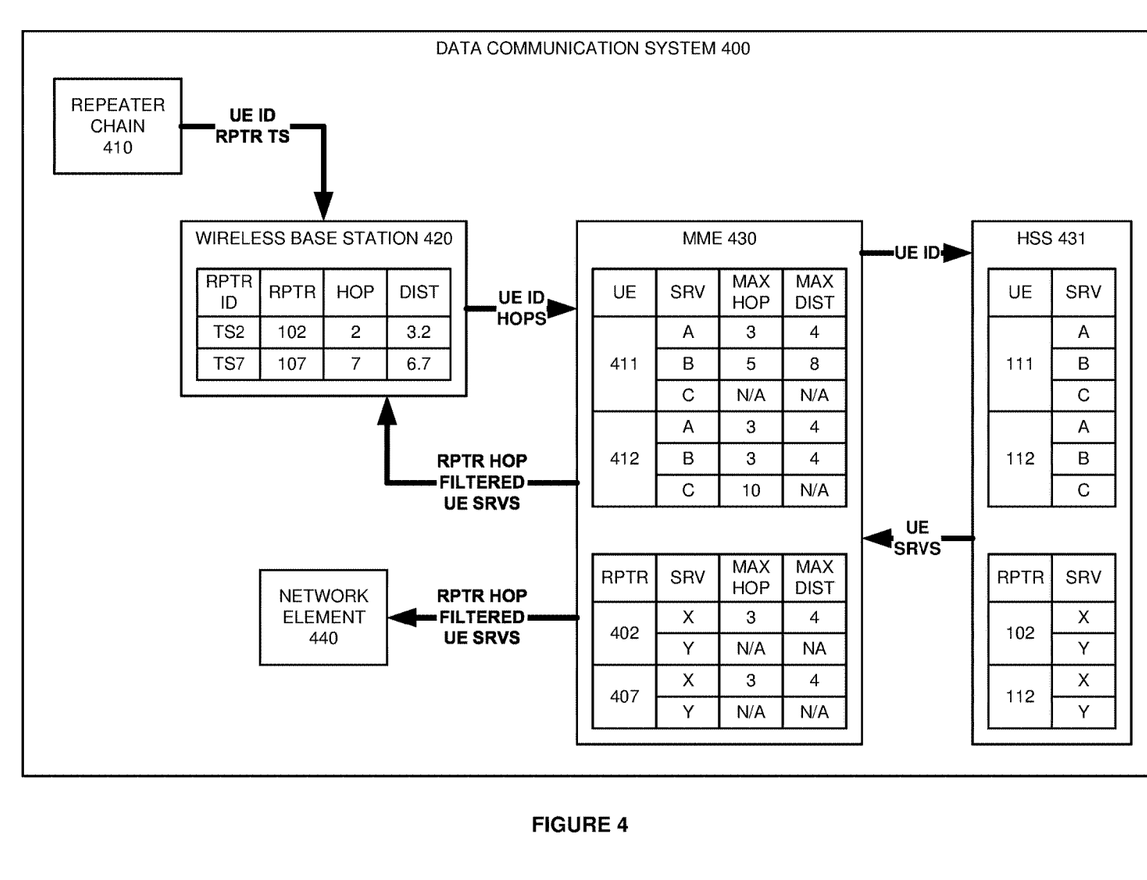
FIG. 4 illustrates a data communication system with a Mobility Management Entity (MME) to control data services for wireless communication devices that attach to a wireless repeater chain.

FIG. 4 illustrates data communication system 400 with Mobility Management Entity (MME) 430 to control data services for wireless communication devices that attach to wireless repeater chain 410. Data communication system 400 is an example of data communication system 100, although system 100 may have different configurations and operations. Data communication system 400 comprises repeater chain 410, wireless base station 420, MME 130, Home Subscriber System (HSS) 431, and network element 440.

Consider an example where a UE attaches to a serving wireless repeater in wireless repeater chain 410. Wireless base station 420 receives the attachment signaling for the UE from wireless repeater chain 410. In this example, wireless base station 420 identifies the serving repeater in chain 410 by its latency as indicated by Time Stamp (TS) data. The RPTRs each have a unique latency signature for their communications with wireless base station 420. The serving repeaters may also insert their RPTR ID on user communications for directly served UEs. Wireless base station 420 enters its data structure based the TS data (or RPTR ID) to identify the serving wireless repeater. Wireless base station 420 then identifies the number of wireless repeater hops and the distance for the attaching UE. The repeater TS data, hop counts, and distances are configured in wireless base station 420 upon repeater installation.

Wireless base station 420 transfers attachment signaling indicating the UE ID, the number of wireless repeater hops, and the distance to MME 430. MME 130 transfers attachment signaling indicating the UE ID to HSS 431 to obtain all possible data services for the UE—generally subscribed and default services. MME 430 then enters its data structure with each possible data service for the UE to filter the possible data services based on the UE ID, the number of wireless repeater hops, and the distance. If the actual hop number is equal/lower than the maximum hop number and if the actual distance is equal/lower than the maximum distance, then the data service may be delivered.

MME 430 exchanges session creation signaling with network element 440 indicating the filtered set of data services for the UE. MME 430 also transfers session context signaling indicating the UE and the selected and filtered set of the data services to wireless base station 420. The data services may comprise Access Point Names (APNs), Uniform Resource Indicators (URIs), or some other service ID.

In another operation, a RPTR attaches to a serving wireless repeater in wireless repeater chain 410. Wireless base station 420 receives the attachment signaling for the RPTR from wireless repeater chain 410. Wireless base station 420 determines the serving RPTR ID based on TS data (or RPTR ID). Wireless base station 420 enters its data structure based the TS data to identify the serving wireless repeater. Wireless base station 420 then identifies the number of wireless repeater hops and the distance for the attaching RPTR.

Wireless base station 420 transfers attachment signaling indicating the RPTR ID, the number of wireless repeater hops, and the distance to MME 430. MME 430 transfers attachment signaling indicating the RPTR ID to HSS 431 to obtain the possible repeater data services for the attaching RPTR. MME 430 then enters its data structure with each possible data service for the RPTR to filter the possible data services based on the RPTR ID, the number of wireless repeater hops, and the distance. If the actual hop number is equal/lower than the maximum hop number and if the actual distance is equal/lower than the maximum distance, then the RPTR data service may be delivered. MME 430 exchanges session creation signaling with network element 440 indicating the filtered repeater data services for the RPTR. MME 430 also transfers session context signaling indicating the RPTR and the filtered set of repeater data services to wireless base station 420.

Figure 5:
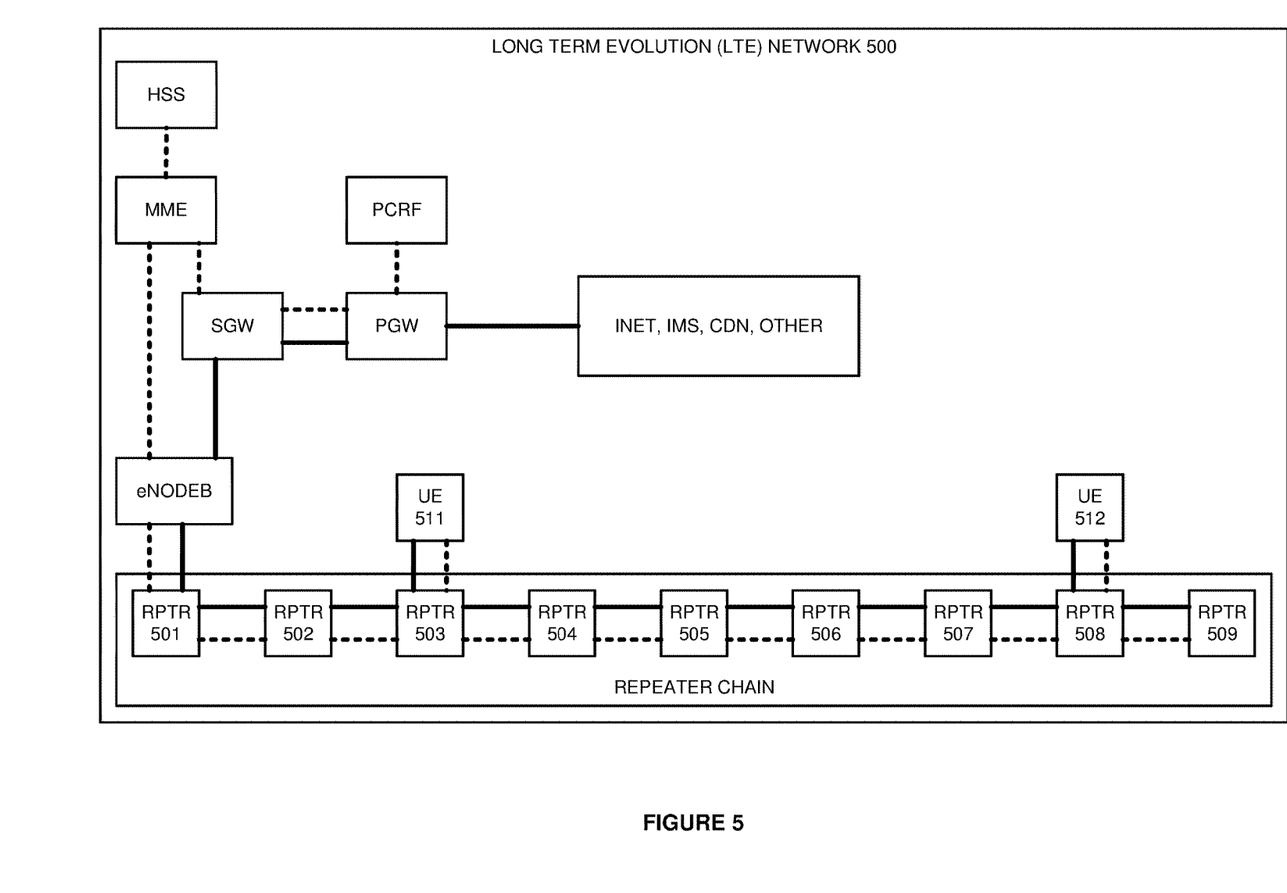
FIGS. 5-7 illustrate a Long Term Evolution (LTE) network to control data services for User Equipment (UE) that attaches to a wireless repeater chain.
Figure 6:
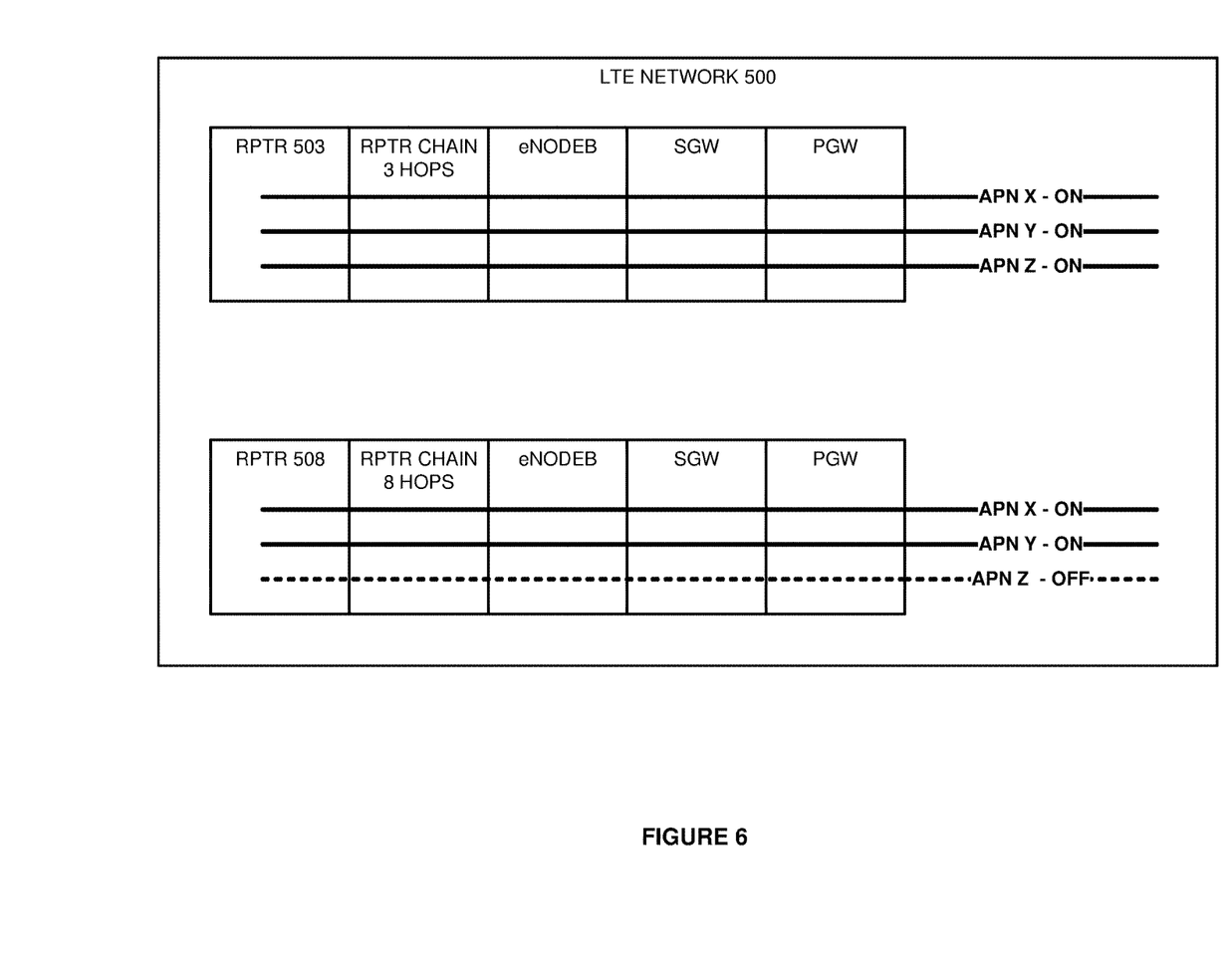
Figure 7:
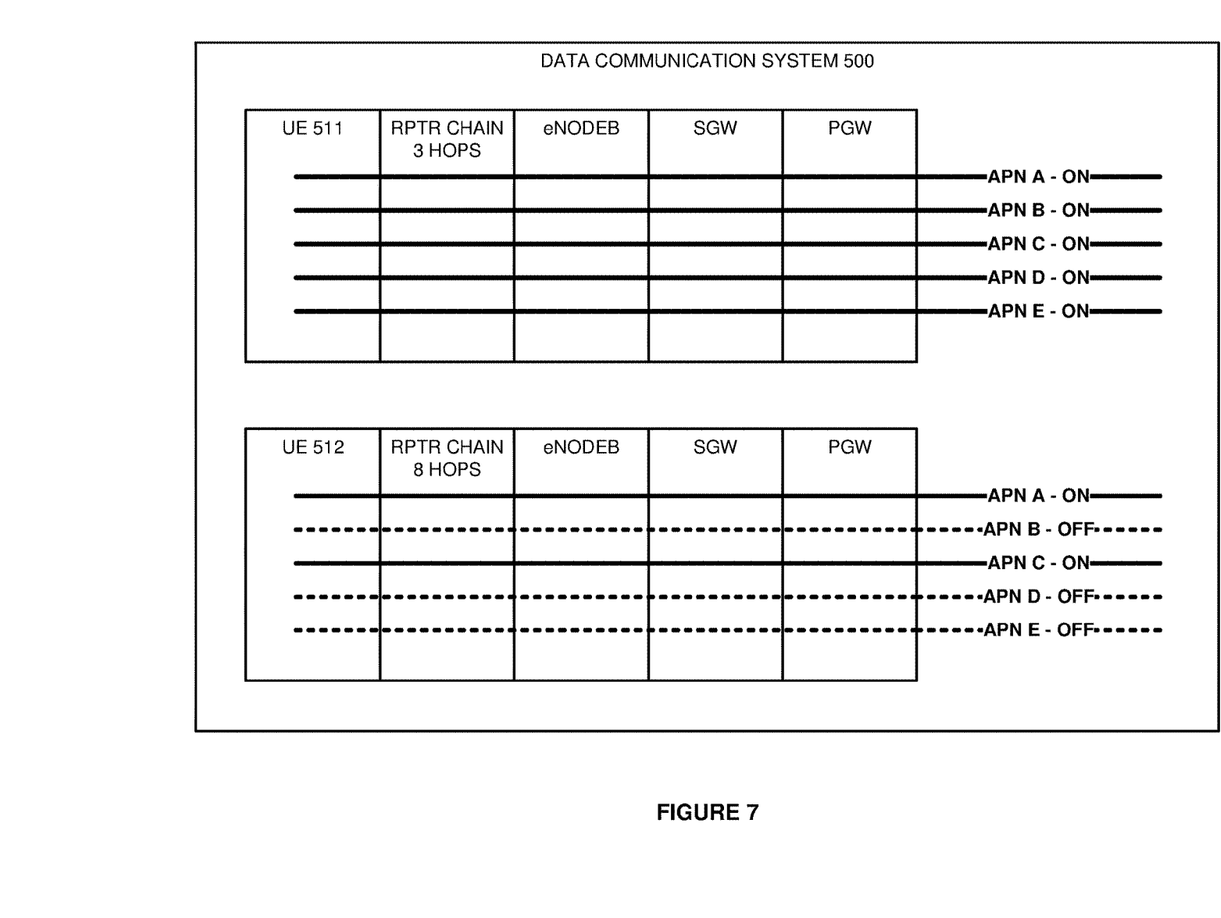

FIGS. 5-7 illustrate Long Term Evolution (LTE) network 500 to control data services for User Equipment (UEs) 511-512 that attach to a wireless repeater chain. Referring to FIG. 5, LTE network 500 comprises a repeater chain, UEs 511-512, evolved NodeB (eNodeB), MME, Home Subscriber System (HSS), Serving Gateway (SGW), Packet Data Network Gateway (PGW), and Policy Charging Rules Function (PCRF). The PGW is linked to various systems like the Internet, Internet Protocol Multimedia Subsystem (IMS), Content Delivery Networks (CDNs), and other data networks. The repeater chain comprises wireless repeaters 501-509.

Before UEs 511-512 attach, RPTR 503 attaches to serving RPTR 502 in the wireless repeater chain. The eNodeB receives the attachment signaling for RPTR 503 from the wireless repeater chain. In response, the eNodeB identifies the number of wireless repeater hops (2) for RPTR 503 between the eNodeB and serving wireless repeater 502. Also in response to the attachment signaling, the eNodeB transfers S1AP initial UE signaling indicating the RPTR identity and the number of wireless repeater hops (2) to the MME. The MME receives the initial UE signaling and dips the HSS to identify the possible Access Point Names (APNs) for RPTR 503. The MME then filters the possible APNs by the RPTR hop count (2) to select filtered APNs for RPTR 503. At 2 RPTR hops, all APNs are available for RPTR 503. MME 130 exchanges S11 create session signaling with the SGW indicating the filtered APNs for RPTR 503. The SGW transfers S5 create bearer signaling to the PGW which dips the PCRF with the RPTR ID and the filtered APNs to obtain Quality-of-Service Class Identifiers (QCIs). The PGW allocates an IP address to RPTR 503 and returns the IP address and QCIs for the filtered APNs for RPTR 503 to the SGW. The SGW forwards the IP address and QCIs for the filtered APNs for RPTR 503 to the MME. The MME sends the IP address and QCIs for the filtered APNs for RPTR 503 to the eNodeB in S1AP initial context setup request signaling. The eNodeB sends the IP address and QCIs for the filtered APNs to RPTR 503 in RRC Connection Reconfiguration signaling. RPTR 503 may then invoke the filtered APNs to exchange user data over the RPTR chain, eNodeB, SGW, and PGW.

RPTR 508 then attaches to serving wireless repeater 507 in the wireless repeater chain. The eNodeB receives the attachment signaling for RPTR 508 from the wireless repeater chain. In response, the eNodeB identifies the number of wireless repeater hops (7) for RPTR 508 between the eNodeB and serving wireless repeater 507. Also in response to the attachment signaling, the eNodeB transfers S1AP initial UE signaling indicating the UE identity and the number of wireless repeater hops (7) to the MME. The MME receives the initial UE signaling and dips the HSS to identify the possible APNs for RPTR 508. The MME then filters the possible APNs by the RPTR hop count (7) to select filtered APNs for RPTR 508. At RPTR hop count 7, some APNs will may not be available to RPTR 508. For example, high-definition video conferencing may not be available at 7 repeater hops. MME 130 exchanges S11 create session signaling with the SGW indicating the filtered APNs for RPTR 508. The SGW transfers S5 create bearer signaling to the PGW which dips the PCRF with the RPTR ID and the filtered APNs to obtain QCIs. The PGW allocates an IP address to RPTR 508 and returns the IP address and QCIs for the filtered APNs for RPTR 508 to the SGW. The SGW forwards the IP address and QCIs for the filtered APNs for RPTR 508 to the MME. The MME sends the IP address and QCIs for the filtered APNs for RPTR 508 to the eNodeB in S1AP initial context setup request signaling. The eNodeB sends the IP address and QCIs for the filtered APNs to RPTR 508 in RRC Connection Reconfiguration signaling. RPTR 508 may then invoke the filtered APNs to exchange user data over the RPTR chain, eNodeB, SGW, and PGW.

After RPTRs 503 and 508 attach, UE 511 attaches to serving wireless repeater 503 in the wireless repeater chain. The eNodeB receives the attachment signaling for UE 511 from the wireless repeater chain. In response, the eNodeB identifies the number of wireless repeater hops (3) for UE 511 between the eNodeB and serving wireless repeater 503. Also in response to the attachment signaling, the eNodeB transfers S1AP initial UE signaling indicating the UE identity and the number of wireless repeater hops (3) to the MME. The MME receives the initial UE signaling and dips the HSS to identify the possible Access Point Names (APNs) for UE 511. The MME then filters the possible APNs by the RPTR hop count (3) to select filtered APNs for UE 511. At 3 RPTR hops, all APNs should be available for UE 511. MME 130 exchanges S11 create session signaling with the SGW indicating the filtered APNs for UE 511.

The SGW transfers S5 create bearer signaling to the PGW which dips the PCRF with the UE ID and the filtered APNs to obtain QCIs. The PGW allocates an IP address to UE 511 and returns the IP address and QCIs for the filtered APNs for UE 511 to the SGW. The SGW forwards the IP address and QCIs for the filtered APNs for UE 511 to the MME. The MME sends the IP address and QCIs for the filtered APNs for UE 511 to the eNodeB in S1AP initial context setup request signaling. The eNodeB sends the IP address and QCIs for the filtered APNs to UE 511 in RRC Connection Reconfiguration signaling. UE 511 may then invoke the filtered APNs to exchange user data over the RPTR chain, eNodeB, SGW, and PGW.

UE 512 then attaches to serving wireless repeater 508 in the wireless repeater chain. The eNodeB receives the attachment signaling for UE 512 from the wireless repeater chain. In response, the eNodeB identifies the number of wireless repeater hops (8) for UE 512 between the eNodeB and serving wireless repeater 508. Also in response to the attachment signaling, the eNodeB transfers S1AP initial UE signaling indicating the UE identity and the number of wireless repeater hops (8) to the MME. The MME receives the initial UE signaling and dips the HSS to identify the possible APNs for UE 512. The MME then filters the possible APNs by the RPTR hop count (8) to select filtered APNs for UE 512. At RPTR hop count 8, some APNs will probably not be available to UE 512. MME 130 exchanges S11 create session signaling with the SGW indicating the filtered APNs for UE 512.

The SGW transfers S5 create bearer signaling to the PGW which dips the PCRF with the UE ID and the filtered APNs to obtain QCIs. The PGW allocates an IP address to UE 512 and returns the IP address and QCIs for the filtered APNs for UE 512 to the SGW. The SGW forwards the IP address and QCIs for the filtered APNs for UE 512 to the MME. The MME sends the IP address and QCIs for the filtered APNs for UE 512 to the eNodeB in S1AP initial context setup request signaling. The eNodeB sends the IP address and QCIs for the filtered APNs to UE 512 in RRC Connection Reconfiguration signaling. UE 512 may then invoke the filtered APNs to exchange user data over the RPTR chain, eNodeB, SGW, and PGW.

Referring to FIG. 6, LTE network 500 is shown in a comparative format for RPTRs 503 and 508. At the top left, RPTR 503 is coupled through 3 RPTR hops to the eNodeB. As a result of the low hop count, all repeater APNs X, Y, and Z are ON for RPTR 503. At the bottom left, RPTR 508 is coupled through 8 RPTR hops to the eNodeB. Repeater APNs X and Y are ON for RPTR 508, but as the result of the high hop count, APN Z is OFF for RPTR 508.

Referring to FIG. 7, LTE network 500 is shown in a comparative format for UEs 511-512. At the top left, UE 511 is coupled through 3 RPTR hops to the eNodeB. As a result of the low hop count, all UE APNs A, B, C, D, and E are ON for UE 511. At the bottom left, UE 512 is coupled through 8 RPTR hops to the eNodeB. UE APNs A and C are ON for UE 512, but as the result of the high hop count, APNs B, D, and E are OFF for UE 512.

Figure 8:
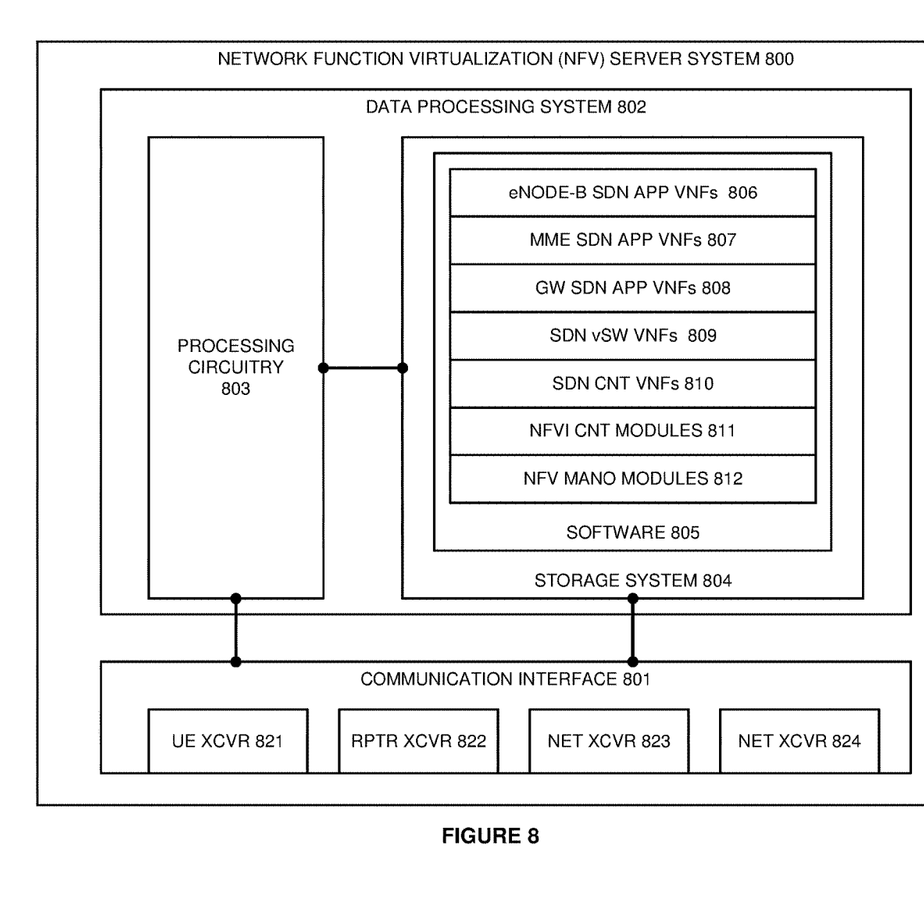
FIG. 8 illustrates a Network Function Virtualization (NFV) server system to control data services for wireless communication devices that attach to a wireless repeater chain.

FIG. 8 illustrates Network Function Virtualization (NFV) server system 800 to control data services for wireless communication devices that attach to a wireless repeater chain. NFV server system 800 is an example of data communication system 100, although system 100 may use alternative configurations and operations. NFV server system 800 comprises data communication interface 801 and data processing system 802. Data communication interface 801 comprises UE transceiver (XCVR) 821, RPTR transceiver 822, and network transceivers 823-824. Data processing system 802 comprises processing circuitry 803 and storage system 804. Storage system 804 stores software 805. Software 805 includes respective software modules 806-812.

Transceivers 821-824 comprise communication components, such as ports, bus interfaces, signal processors, antennas, filters, amplifiers, memory, software, and the like. Processing circuitry 803 comprises server blades, circuit boards, bus interfaces, integrated circuitry, and associated electronics. Storage system 804 comprises non-transitory, machine-readable, data storage media, such as flash drives, disc drives, memory circuitry, servers, and the like. Software 805 comprises machine-readable instructions that control the operation of processing circuitry 803 when executed. Software 805 includes software modules 806-812. NFV server system 800 may be centralized or distributed. All or portions of software 806-812 may be externally stored on one or more storage media, such as circuitry, discs, and the like. Some conventional aspects of NFV server system 800 are omitted for clarity, such as power supplies, enclosures, and the like.

When executed by processing circuitry 803, software modules 806-812 direct circuitry 803 to perform the following operations. eNodeB Software Defined Network (SDN) Application (APP) Virtual Network Functions (VNFs) 806 drive base station operations including adding repeater hop counts and distance to attachment signaling. MME SDN APP VNFs 807 drive network operations like UE service authorization, APN selection and filtering by repeater hop count, and mobility management. Gateway (GW) SDN APP VNFs 808 perform data routing, filtering, and gateway management. SDN vSW modules 809 provide SDN north/south and east/west interfaces to VNFs 806-808 and 810. SDN CNT VNFs 810 expose an SDN Application Programming Interface (API) to SDN modules 806-808 to control SDN data machines in the field. NFV Infrastructure (NFVI) control modules 811 include hypervisors and virtual machines to create a virtualized networking environment. NFV Management and Orchestration (MANO) modules 812 include orchestrators, VNF Managers (VNFMs) and Virtual Infrastructure Managers (VIMs) to control the operation of the NFVIs and VNFs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data communication system to control data services for User Equipment (UE) attached to a serving wireless repeater in a wireless repeater chain, the method comprising:
a wireless base station receiving attachment signaling for the UE from the wireless repeater chain and responsively identifying a number of repeater hops for the UE between the wireless base station and the serving wireless repeater and transferring initial UE signaling indicating the UE identity and the number of wireless repeater hops;
a network controller receiving the initial UE signaling and responsively selecting a set of the data services for the UE based on the UE identity and the number of wireless repeater hops;
the network controller exchanging session creation signaling indicating the selected set of the data services for the UE with at least one network element to deliver the selected set of the data services to the UE;
the network controller transferring S1AP Initial Context Setup Request signaling indicating the UE, the selected set of the data services for the UE, and a non-selected set of the data services for the UE for delivery to the wireless base station; and
the wireless base station transferring Radio Resource Control (RRC) signaling to the wireless repeater chain for delivery to the UE indicating the selected set of the data services and the non-selected set of the data services.

2. The method of claim 1 wherein the data services comprise Access Point Names (APNs).

3. The method of claim 1 wherein the data services comprise Uniform Resource Indicators (URIs).

4. The method of claim 1 wherein the wireless base station comprises an evolved Node B (eNodeB).

5. The method of claim 1 wherein the network controller comprises a Mobility Management Entity (MME).

6. The method of claim 1 wherein the network controller comprises a Home Subscriber System (HSS).

7. The method of claim 1 wherein the initial signaling from the wireless base station to the network controller comprises S1AP Initial UE signaling that indicates the number of wireless repeater hops.

8. The method of claim 1 further comprising:
the wireless base station identifying a distance between the wireless base station and the serving wireless repeater and wherein transferring the initial UE signaling comprises transferring the initial UE signaling indicating the distance; and
wherein the network controller selecting the set of the data services for the UE comprises the network controller selecting the set of the data services for the UE based on the UE identity, the number of wireless repeater hops, and the distance.

9. A data communication system to control data services for User Equipment (UE) attached to a serving wireless repeater in a wireless repeater chain, the data communication system comprising:
a wireless base station configured to receive attachment signaling for the UE from the wireless repeater chain and responsively identify a number of repeater hops for the UE between the wireless base station and the serving wireless repeater and transfer initial UE signaling indicating the UE identity and the number of wireless repeater hops;
a network controller configured to receive the initial UE signaling and responsively select a set of the data services for the UE based on the UE identity and the number of wireless repeater hops;
the network controller configured to exchange session creation signaling indicating the selected set of the data services for the UE with at least one network element to deliver the selected set of the data services to the UE;
the network controller configured to transfer S1AP Initial Context Setup Request signaling indicating the UE, the selected set of the data services for the UE, and a non-selected set of the data services for the UE for delivery to the wireless base station; and
the wireless base station configured to transfer Radio Resource Control (RRC) signaling to the wireless repeater chain for delivery to the UE indicating the selected set of the data services and the non-selected set of the data services.

10. The data communication system of claim 9 wherein the data services comprise Access Point Names (APNs).

11. The data communication system of claim 9 wherein the data services comprise Uniform Resource Indicators (URIs).

12. The data communication system of claim 9 wherein the wireless base station comprises an evolved Node B (eNodeB).

13. The data communication system of claim 9 wherein the network controller comprises a Mobility Management Entity (MME).

14. The data communication system of claim 9 wherein the network controller comprises a Home Subscriber System (HSS).

15. The data communication system of claim 9 wherein the initial signaling from the wireless base station to the network controller comprises S1AP Initial UE signaling that indicates the number of wireless repeater hops.

16. The data communication system of claim 9 wherein:
the wireless base station is configured to identify a distance between the wireless base station and the serving wireless repeater and transfer the initial UE signaling indicating the distance; and
the network controller is configured to select the set of the data services for the UE based on the UE identity, the number of wireless repeater hops, and the distance.

* * * * *